United States Patent
Stephenson, Jr.

[11] Patent Number: 5,235,332
[45] Date of Patent: Aug. 10, 1993

[54] PARALLEL DS3 AID/IDLE CODE GENERATOR

[75] Inventor: William H. Stephenson, Jr., Raleigh, N.C.

[73] Assignee: Alcatel Network Systems, Inc., Richardson, Tex.

[21] Appl. No.: 807,981

[22] Filed: Dec. 16, 1991

[51] Int. Cl.[5] .............................................. H03M 7/00
[52] U.S. Cl. ...................................... 341/50; 375/112
[58] Field of Search .................. 341/50, 100, 101, 95, 341/55; 370/1, 4, 58.1, 60.1, 99, 102; 375/112

[56] References Cited

U.S. PATENT DOCUMENTS 4,967,405 10/1990 Upp et al. ............................. 370/1
5,030,951 7/1991 Eda et al. ............................. 341/100

Primary Examiner—A. D. Pellinen
Assistant Examiner—Brian K. Young
Attorney, Agent, or Firm—Ware, Fressola, Van der Sluys & Adolphson

[57] ABSTRACT

Apparatus for converting a DS3 digital signal in a DS3 frame format to a STS-1 digital signal in an STS-1 frame format as a function of a STS-1 local clock. DS3 AIS/Idle code generation means generates DS3 AIS/Idle code bytes in response to the local STS-1 clock signal. DS3 byte counter counts the DS3 AIS/Idle code bytes and generating an AIS/Idle bytecount enable control signal if the number of DS3 AIS/Idle code bytes is less than a predetermined number of DS3 bytes to be mapped in a given row of the STS-1 frame. STS-1 row counter counts pulses of the STS-1 local clock signal and generates a gapped STS-1 enable control signal, which is combined with the AIS/Idle bytecount enable control signal fed back to enable and disable the DS3 AIS/Idle code generation means for mapping DS3 AIS/Idle code bytes in the given row of the STS-1 frame. In a preferred embodiment the DS3 byte counter comprises a plurality of flip-flops and associated combinatorial logic for counting the DS3 AIS/Idle code bytes, and has combinatorial logic for receiving inputs from the plurality of flip-flops for generating an AIS/Idle bytecount enable control signal. The STS-1 row counter has a plurality of flip-flops and associated combinatorial logic for counting pulses of the STS-1 local clock signal, and has combinatorial logic which receives inputs from the plurality of flip-flops for generating a gapped STS-1 enable control signal. The apparatus also has a short row control signal generator for generating a short row control signal to the DS3 byte counter.

13 Claims, 22 Drawing Sheets

| FIG. 1A | FIG. 1B |

FIG. 1

| FIG. 8A | FIG. 8B |

FIG. 8

| FIG. 9A | FIG. 9B |
| FIG. 9C | |

FIG. 9

FIG. 10
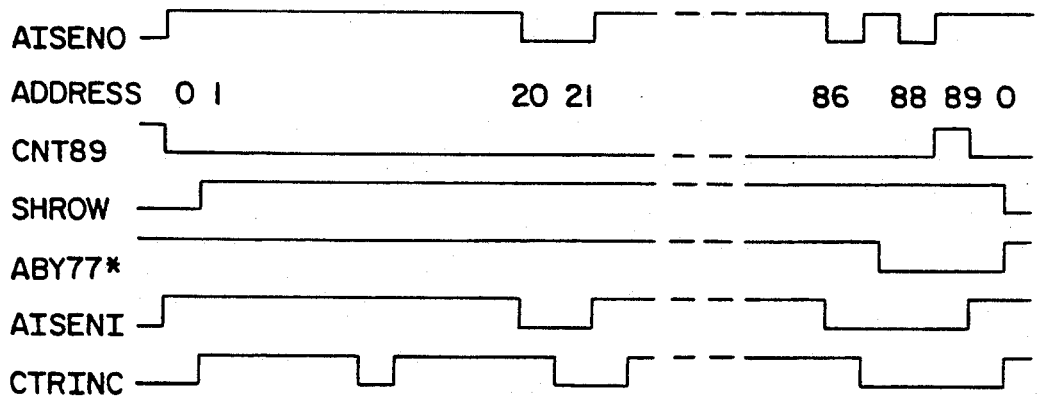
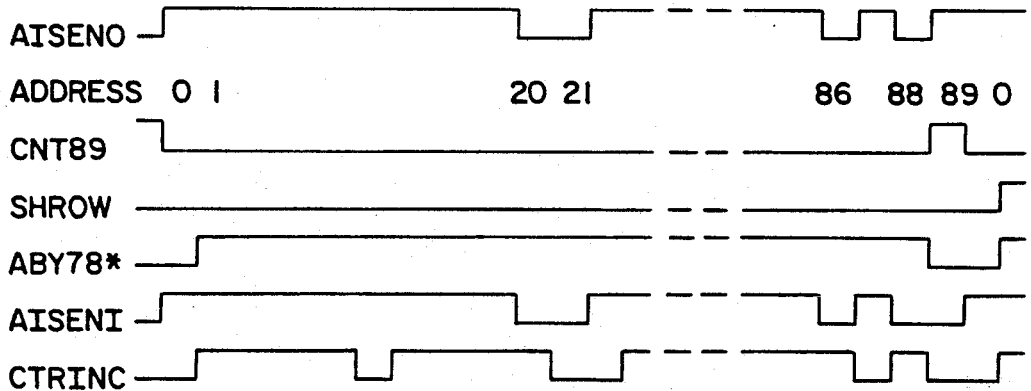
FIG. 11

PARALLEL DS3 AID/IDLE CODE GENERATOR

BACKGROUND OF THE INVENTION

1. Field of the Invention

This invention relates generally to the field of digital data communication equipment, and more particularly to communication equipment which interfaces two networks, one transmitting data asynchronously and another transmitting data synchronously.

2. Description of the Prior Art

In the prior art of generating a parallel DS3 AIS signal, a DS3 clock is synthesized or a local oscillator is used to generate a DS3 clock. (The acronym "DS3" is the American National Standard Institute designation for a Digital Signal, Level 3.) The clock is then divided by five or by eight to latch five and eight bit words that make up a DS3 frame into a parallel to serial convertor. The serial output is used as is, or it is divided up again into eight bit bytes to be formatted into a DS3 payload.

The major shortcoming with this method is that an alternate DS3 clock must be generated whenever the normal clock fails. A DS3 clock failure or data failure requires a second clock to be used to generate the Alarm Indication Signal (AIS). A framed DS3 AIS payload must be created and passed to the next stage in place of the normal DS3 data.

The specific shortcomings with the method named above is that an extra clock generator or oscillator circuit is required to produce a divided down DS3 parallel clock of the correct frequency to generate continuous DS3 framed data.

SUMMARY OF THE INVENTION

According to the present invention, apparatus is provided for converting a DS3 digital signal in a DS3 frame format to a STS-1 digital signal in an STS-1 frame format as a function of a STS-1 local clock. (The acronym "STS-1" is the American National Standard Institute designation for a Synchronous Transport Signal, Level 1.) DS3 AIS/Idle code generation means generating DS3 AIS/Idle code bytes in response to the local STS-1 clock signal. A DS3 byte counter counts the DS3 AIS/Idle code bytes and generates an AIS/Idle bytecount enable control signal if the number of DS3 AIS/Idle code bytes is less than a predetermined number of DS3 bytes to be mapped in a given row of the STS-1 frame. An STS-1 row counter counts pulses of the STS-1 local clock signal and generates a gapped STS-1 enable control signal, which is combined with the AIS/Idle bytecount enable control signal and fed back to enable and disable the DS3 AIS/Idle code generation means for mapping DS3 AIS/Idle code bytes in the given row of the STS-1 frame.

In a preferred embodiment, the DS3 byte counter comprises a plurality of flip-flops and associated combinatorial logic for counting the DS3 AIS/Idle code bytes, and has combinatorial logic for receiving inputs from the plurality of flip-flops for generating an AIS/Idle bytecount enable control signal. The STS-1 row counting means has a plurality of flip-flops and associated combinatorial logic for counting pulses of the STS-1 local clock signal, and has combinatorial logic which receives inputs from the plurality of flip-flops for generating a gapped STS-1 enable control signal. The apparatus also has short row control signal generating means for generating a short row control signal to the DS3 byte counter.

The invention may be used in many different types of applications including communication interface devices that convert DS3 to STS-1, and STS-1 to DS3.

Other objects, features and advantages of the present invention will become apparent from the following detailed description when taken in connection with the accompanying drawing.

DESCRIPTION OF THE DRAWINGS

FIG. 10 shows a timing diagram for generating a 77 byte AIS row.

FIG. 11 shows a timing diagram for generating a 78 byte AIS row.

DETAILED DESCRIPTION OF THE INVENTION

Figure 1A:
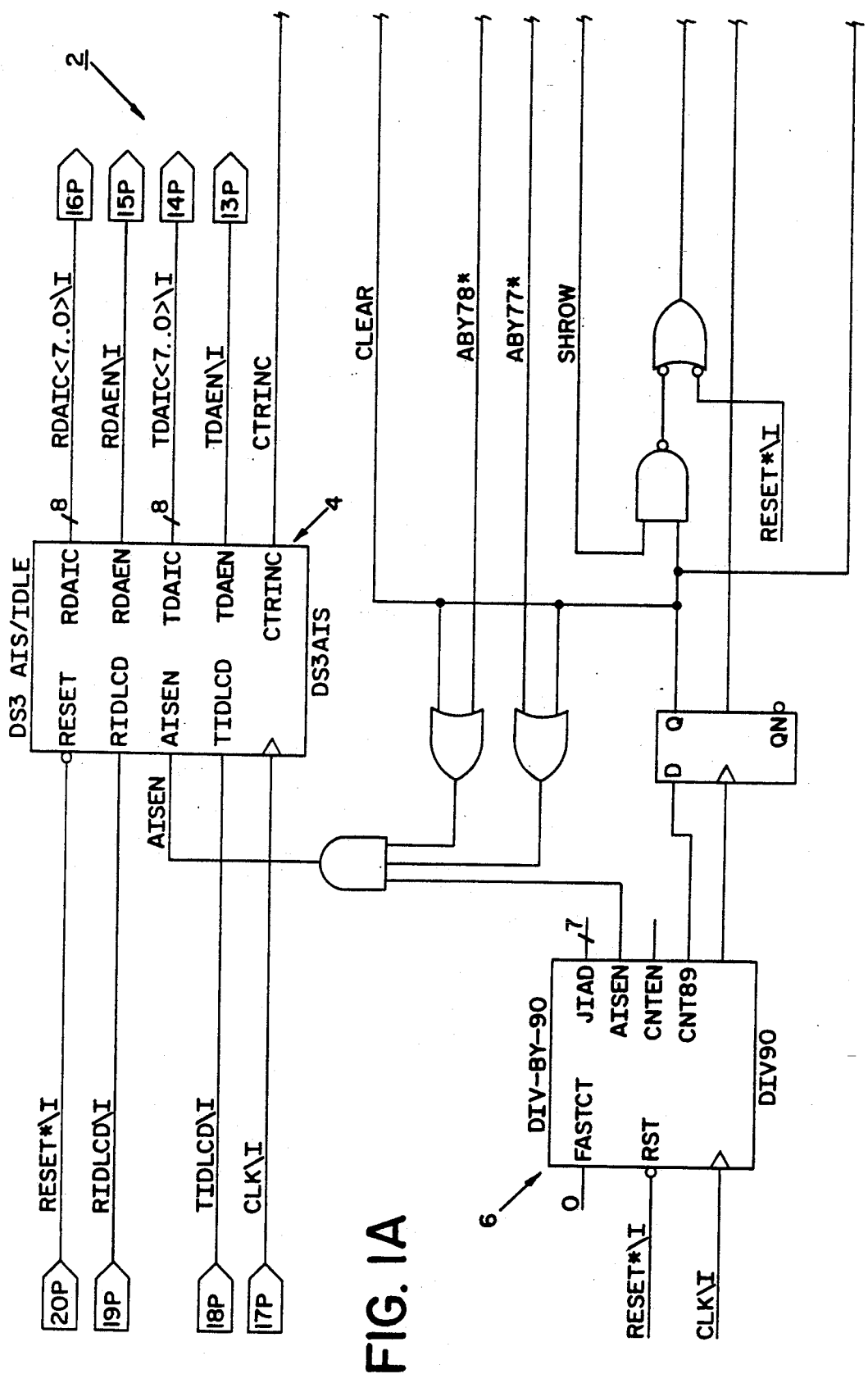
FIG. 1 shows the reconstruction of FIGS. 1A and 1B which show a schematic of a DS3 AIS/Idle code generator.

I. The Invention In Its General Application

In general, a parallel DS3 AIS generator uses a gapped local SONET clock to generate a correct AIS frame instead of a DS3 clock. Counters and control logic are used to generate the DS3 AIS frame, as well as some multiplexers which are hard wired to produce an alternating 1010 AIS code or an alternating 1100 DS3 Idle Code with the appropriate framing bits included.

In operation, the 699 bytes that make up a 125 microsecond section of DS3 data stream are counted. An AIS byte counter outputs an enable signal to stop the generator after the necessary number of bytes have been created. The parallel output can then be put through an elastic store buffer and a usable DS3 clock can be recovered from it.

A DS3 frame is composed of 56 subframes each comprising 85 bits each. Each subframe includes ten 8-bit bytes and a 5-bit byte. This frame format causes a problem with keeping the parallel data continuous. First a circuit is needed that converts partial bytes of data to full bytes. Such a circuit is described in a copending application by the same inventor, entitled 'Partial Word to Full Word Parallel Data Shifter', inventor William H. Stephenson, Jr., filed on the same day as this application, assigned to the same assignee, and which is hereby incorporated by reference.

Second it is important for the purpose of this invention, that a stable, higher frequency clock is used and properly gapped to create the exact payload required to extract a 44.736 MHz data using a phase lock loop (PLL). As discussed in great detail below, the actual implementation consists of a plurality of multiplexers used to format the correct pattern, a divide-by-11 counter, a divide-by-8 counter, a divide-by-7 counter, a parallel data shifter, and a row counter that controls the count enable and the output of the data.

The divide-by-11 counter is used to count the 85 bits in a subframe, the divide-by-8 counter is used to count the 8 subframes in a M-frame, and the divide-by-7 counter is used to count the 7 M-frames in a DS3 frame. Combinatorial logic is used to insert the correct framing pattern in the first bit position of each subframe. The parallel data shifter is used to add the 5-bit bytes, and realign the 8-bit bytes to produce full 8-bit output bytes. A divide-by-90 column counter is used to generate a properly gapped count enable signal. The AIS Byte counter counts the number of output bytes per row from the parallel data shifter, allowing 78 bytes for 2 rows and 77 bytes for every third row which adds up to 699 DS3 AIS bytes per 9 rows which equals one SONET frame. This is the feedback path which can be changed to allow the formatter to operate with clock speeds greater than 6.48 MHz.

II. A Detailed Description of a Specific Embodiment

As is generally known in the art of telecommunications, an interface device is needed to couple a standard DSx network for transmitting and receiving asynchronous electrical signals to and from a synchronous optical network (hereinafter "SONET Network") transmitting and receiving synchronous optical signals. In a standard DS3 network, the asynchronous signals are communicated in series, bit by bit, at a standard rate of 44.736 MHz and formatted in a well-known Digital Signal level 3 frame (hereinafter "DS3 Frame"). The DS3 frame comprises 7 Mframes, each Mframe having 8 subframes, each subframe having 85 bits of information, for a total of 595 bytes (4760 bits). In a standard OC1 SONET network, the synchronous optical signals are formatted in parallel and transmitted in serial at a standard optical coupling rate of 51.840 MHz, known as STS-1 (hereinafter "STS-1 frame"). The STS-1 frame comprises 90 columns and 9 rows of bytes, for a total 810 bytes (6480 bits). See for example American National Standards for Telecommunications, Digital Hierarchy-Optical Interface Rates and Formats Specification, ANSI T1.105-1988.

The present invention includes means for generating an Alarm Indication Signal (hereinafter AIS signal) when a loss of a DS3 system clock signal or a loss of data signal on the DS3 line is detected. It is known in the art of communication networks that during the generation of these AIS/Idle code signals partial bytes result because of the inherently different formatting scheme between the asynchronous DS3 frame and the synchronous STS-1 frame and the inherently different transmission rates at different clock speeds.

1. The Interface Device in General

A preferred implementation of the present invention forms part of an application specific integrated circuit (ASIC) that includes a receiver circuit (not shown). For the purpose of understanding the invention described below, it is sufficient to know that the receiving circuitry receives a DS3 system clock signal at a frequency of 44.736 MHz and divides it in an 8-bit counter to generate a local clock frequency of 5.592 MHz. The receiving circuitry also has a serial/parallel 8-bit data shifter for receiving a serial DS3 data stream at a clock speed of 44.736 MHz and generating it into an 8-bit parallel data stream at a clock speed of 5.592 MHz. The 8-bit parallel data is converted into a STS-1 Synchronous Payload Envelope (SPE) by formatting it with appropriate control bits and stuffing bits, depending on the frequency difference between a DS3 clock rate and a STS-1 clock rate. Logic circuitry controls the DS3/STS-1 data conversion process.

Figure 1B:
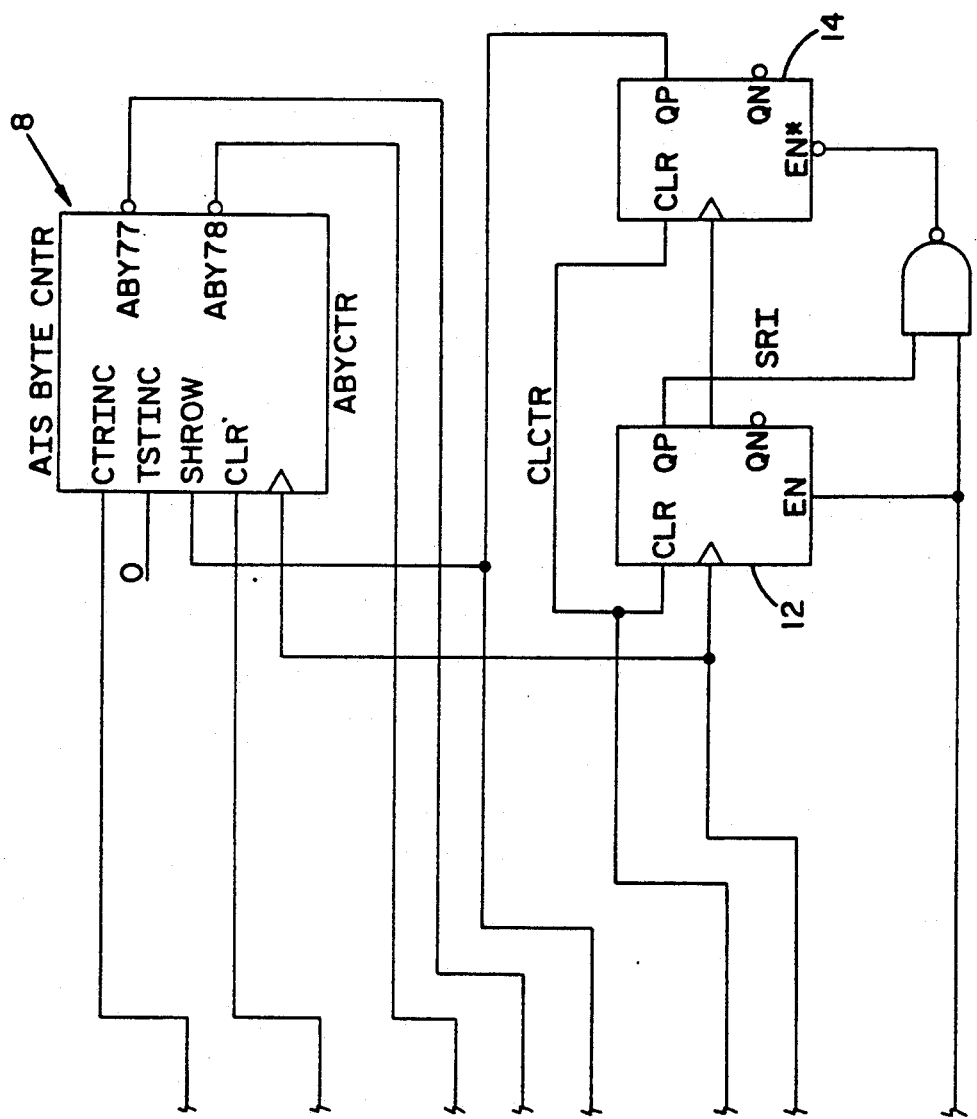

In order to generate the AIS signal when a loss of the system clock signal is detected or the idle control signal when the incoming data stream is lost, the receiving circuitry has a DS3 AIS/Idle code generator 2, shown generally in FIG. 1. It includes a DS3 AIS/Idle code formatter 4 that is digitally interconnected by combinatorial logic to a row counter 6 and an AIS byte counter 8. The DS3 AIS/Idle code generator 2 is used to generate byte wide DS3 AIS data or DS3 Idle Code data at the frequency of the local clock. The DS3 AIS/Idle code generator 2 outputs this data in parallel and an associated write enable signal to a suitable storage means (not shown), which is generally known as an elastic storage means because it functions to buffer the asynchronous DS3 signal in the bit rate conversion process. In one embodiment the AIS and Idle Code data is read into the memory buffer at a frequency of 5.592 MHz, i.e. the DS3 clock signal of 44.736 MHz divided by 8, and written from the memory buffer at a frequency of 6.48M Hz, i.e. the STS-1 clock signal of 51.840 MHz divided by 8. The DS3 AIS/Idle code generator means 4 generates AIS data and Idle Code data which can be used in both the RX and TX directions, and is the focus of this invention.

The DS3 AIS/Idle code generator 4 receives the following system inputs: a reset input RESET*, a local clock input CLK, and receive idle code select input RIDLCD, transmit idle code select inputs TIDLCD, and alarm indication signal enable AISEN. The asterisk "*" following the signal acronym indicates it is active low. The DS3 AIS/Idle code generator 4 generates the following system outputs: the receive output data bus RDAIC <7...0> and the transmit output data busses TDAIC <7...0>, receive output data control enable RDAEN and transmit output data control enable TDAEN, and the counter input increment control signal CTRINC. The DS3 AIS/Idle code generator 4 generates AIS and Idle Code data in both directions of transmission.

2. The DS3 AIS/Idle Generator

Figure 2:
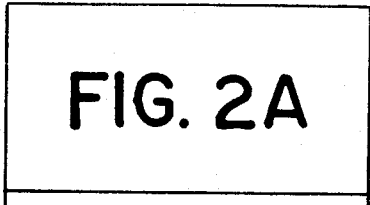
FIG. 2 shows the reconstruction of FIGS. 2A, 2B and 2C which show a schematic of a DS3 AIS/Idle generator.
Figure 2:
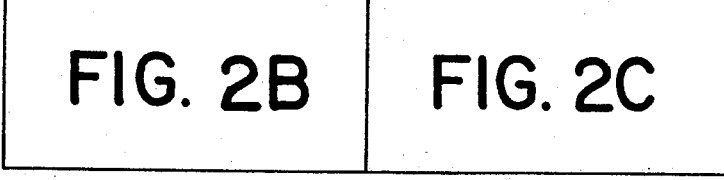

FIG. 2 shows the DS3 AIS/Idle generator 4, which structurally consists of the following: three counters labelled divide-by-11 counter means 20, divide-by-8 counter means 22, and divide-by-7 counter means 24; an AIS and idle code generation means having two 3:1 multiplexers 30 and 32, and two 2:1 multiplexers 34 and 36 (hereinafter "multiplexer 30", "multiplexer 32", etc.) with inputs from associated combinatorial logic; an add 1/5 counter means 40 which performs 1-bit and 5-bit addition; and parallel data shifting means 50 and 52.

In operation the three counters means 20, 22, 24 generate subframe, M-frame and DS3 frame control signals which drive the AIS and idle code generation means. The div-by-11 counter 20 counts the 85 bits per subframe, the div-by-8 counter 22 counts 8 subframes in an M-frame, and the div-by-7 counter 24 counts the 7 M-frames in the DS3 frame. In order to generate the 85 bits of data that comprise a subframe, AIS and idle code generation means generates a first partial byte of 5-bits and then generate 10 successive full bytes. On the first clock pulse of each subframe, the div-by-11 counter 20 generates a first byte control signal BYTONE to the AIS and idle code generator for generating the first byte of data; and on the next ten clock pulses, the full 8-bit code bytes are generated. The parallel data shifter 50 and 52 realigns the 5-bit partial byte by adding it with the 8-bit full bytes to produce an output data stream of all 8-bit bytes which is written to a buffer memory. Details of this data shifter are presented in copending application entitled "Partial Word to Full Word Parallel Data Shifter", inventor William H. Stephenson, Jr., assigned to the present assignee having Ser. No. 07/808,533 and filing date Dec. 16, 1992, and hereby incorporated by reference. The AIS byte counter 8 counts the number of DS3 data bytes per row in the STS-1 frame, generated by the parallel data shifter 50 and 52. The div-by-90 counter column counter 6 generates a properly gapped count enable signal, as a function of the STS-1 clock rate, which will be discussed in great detail below.

3. The AIS/Idle Code Generator Means

As is known in the art, the DS3 code consists of a 1001 Frame Alignment Code, x bits set to logic "1", C and P bits set to logic "0", and information bits of a repeating 1010 pattern with suitable stuffing bits. The bit following the control bit C of each M-subframe is logic "1". Decoding logic selects which blocks of data get control bits "1" or "0". See Bellcore Specification TR-TSY-000499, Issue 3, December 1989, herein incorporated by reference for a more detailed discussion of the DS3 format.

As also shown in FIG. 2, the AIS/Idle code generation means includes multiplexers 30 and 32 which format the DS3 AIS and DS3 Idle Code patterns. Multiplexer 30 has an 8-bit D0 input for receiving AIS data from merge body 53 as "01010000", and an 8-bit D1 input for receiving AIS data from merge body 54 as "11010000". The first bit is a control bit, either "1" or "0", the next four bits are the AIS data pattern "1010", and the last three bits are stuffing bits "000". Multiplexer 30 also has an 8-bit D2 input for receiving an 8-bit AIS data pattern "10101010" from merge body 55. Similarly, multiplexer 32 has an 8-bit D0 input for receiving Idle Code data from merge body 56 as "01100000", and an 8-bit D1 input for receiving AIS data from merge body 57 as "11100000". Similarly, the first bit is a control bit, either "1" or "0", the next four bits are the idle code pattern "1100", and the last three bits are stuffing bits "000". Multiplexer 32 also has an 8-bit D2 input for receiving an 8-bit idle code pattern "11001100" from merge body 58.

The first byte control signal BYTONE is passed through a high drive inverter which controls the D2 inputs of both multiplexers 30 and 32. When BYTONE is active, inputs D1 and D0 can be selected depending on the control logic. Framing decisions are made only when BYTONE is active (high). For example, a 3-input OR gate 60 and a 2-input NAND gate 62 are connected in series and used to select the control bit positions of the first block in subframes 1, 2, and 6. As described below, the control signals D7CNT0, D7CNT1 and D7CNT5 are input from div-by-7 counter 24 into OR gate 60, and its output together with D8CNT0 from div-by-8 counter 22 are input in the NAND gate 62. A 2-input NOR gate 64 receives control signals D8CNT1 and D8CNT7 from div-by-8 counter 22, which select the control bit positions of the second and last block in all of the subframes. The outputs from NAND gate 62 and NOR gate 64 are input into AND gate 66 and inverted by inverter 68 to select input D1 which is a control bit=1. All the other control bits are zero. Therefore, the AIS multiplexer 30 has "11010000" coded at the D1 input and "01010000" coded at the D0 input. The Idle Code multiplexer 32 has "11100000" coded at the D1 input and "01100000" coded at the D0 input. As explained below, the three LSB stuffing bits are overwritten by the parallel data shifter 50 and 52.

When the first byte control signal BYTONE is low, input D2 is selected and multiplexer 30 outputs a repeating "1010" AIS pattern in byte positions 2-11 of each subframe, and multiplexer 32 outputs a 1100 Idle Code pattern in byte positions 2-11 of each subframe.

In operation, the two 2-input multiplexers 34 and 36 are used to independently select AIS data or Idle Code data for the RX and TX sides of the interface device. The 'A' input of both multiplexers are connected to the idle code multiplexer 32, and the 'B' inputs are connected to the AIS multiplexer 30. Multiplexer 30 supplies AIS data to the receive side parallel data shifter 50, and it is controlled by read idle control data signal RIDLCD driving a high drive inverter 70. A logic high on RIDLCD signal selects the idle code output. Multiplexer 32 supplies data to the transmit side parallel data shifter 52, and it is controlled by transmit idle control data signal TIDLCD driving a high drive inverter 72. A logic high on the TIDLCD signal selects the idle code output.

4. The Add 1/5 Counter

Figure 3:
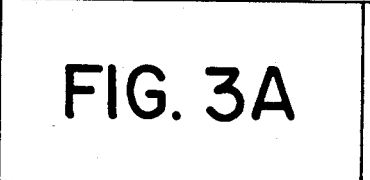
FIG. 3 shows the reconstruction of FIGS. 3A and 3B which show a schematic of an add 1/5 counter.
Figure 3:
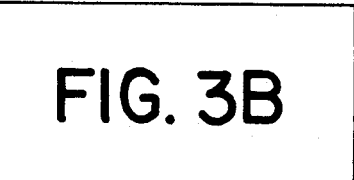

The operation of the add 1/5 counter 40 shown in FIG. 3 is described in applicant's copending application entitled "Partial Word to Full Word Parallel Data Shifter" as identified above.

5. The Parallel Data Shifter

Figure 4:
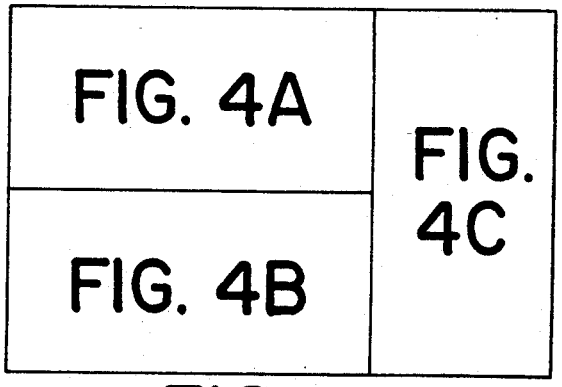
FIG. 4 shows the reconstruction of FIGS. 4A and 4B which show a schematic of a parallel data shifting means.
Figure 4:
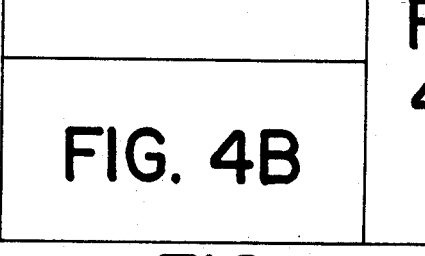
Figure 4:

The operation of parallel data shifters 50 and 52 shown in FIG. 4 is described in applicant's copending application entitled "Partial Word to Full Word Parallel Data Shifter", as identified above.

6. The Div-By-11 Counter

Figure 5:
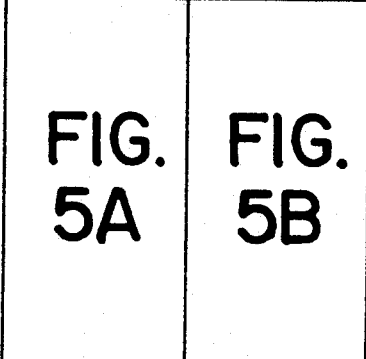
FIG. 5 shows the reconstruction of FIGS. 5A and 5B a schematic of a div-by-11 counter.
Figure 5:
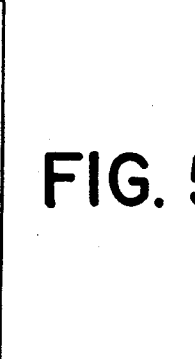
Figure 2A:
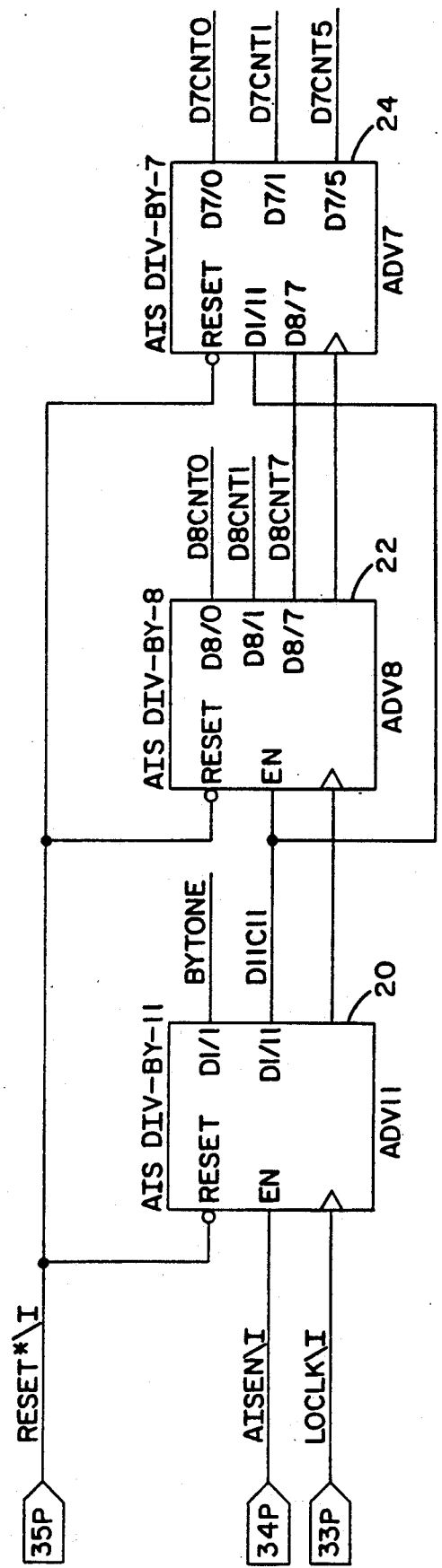
Figure 2B:
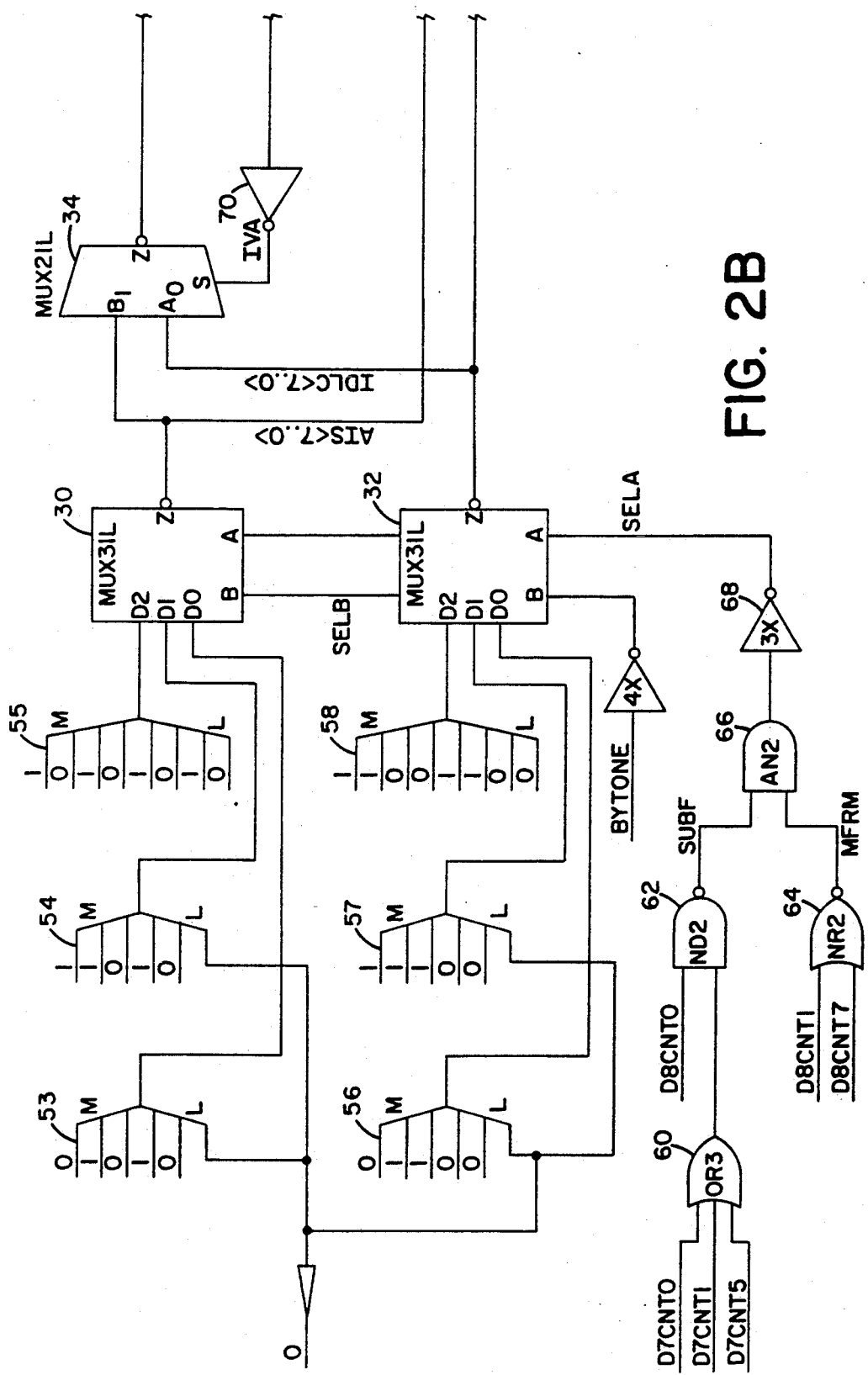
Figure 2C:
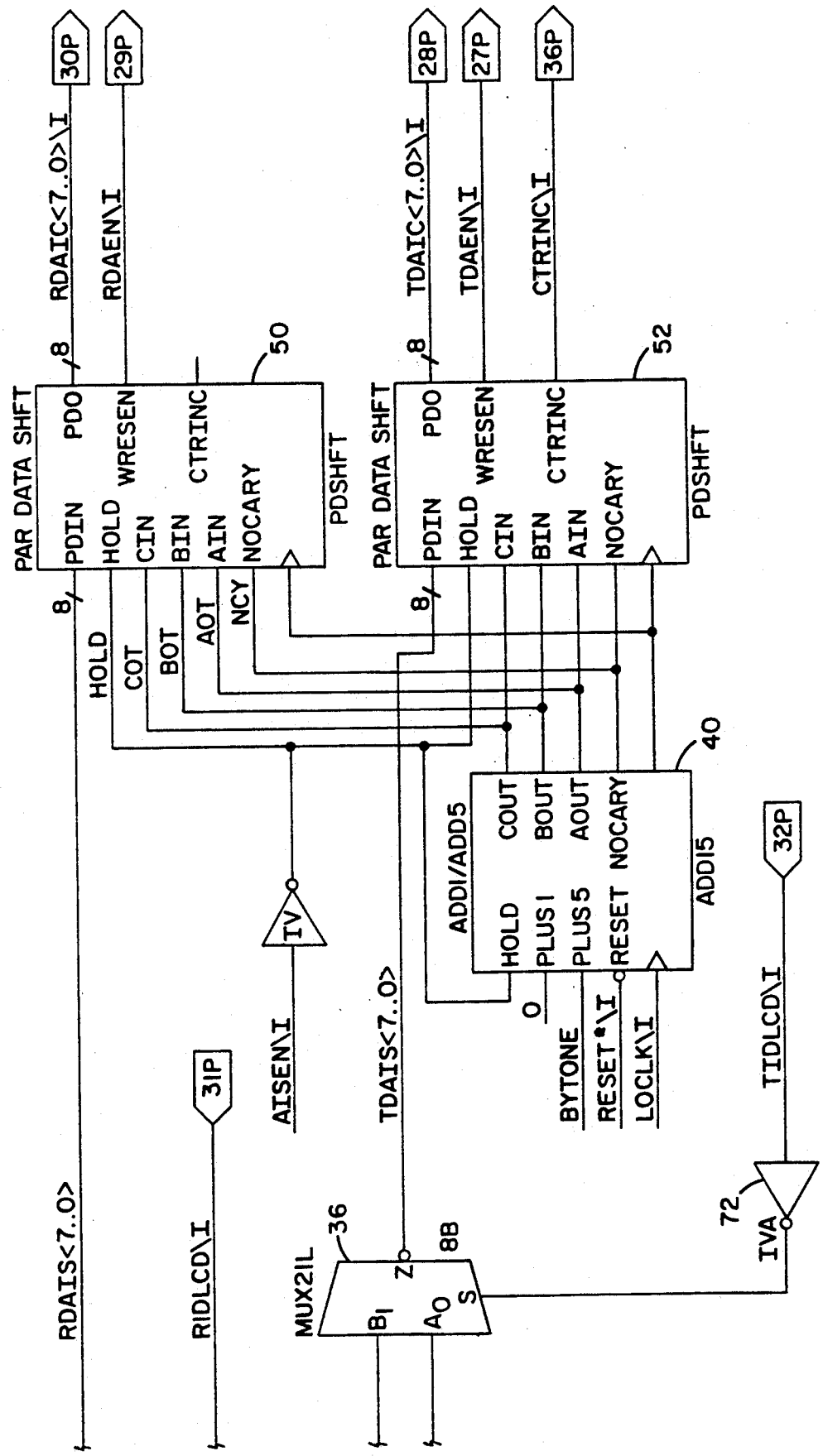
Figure 3A:
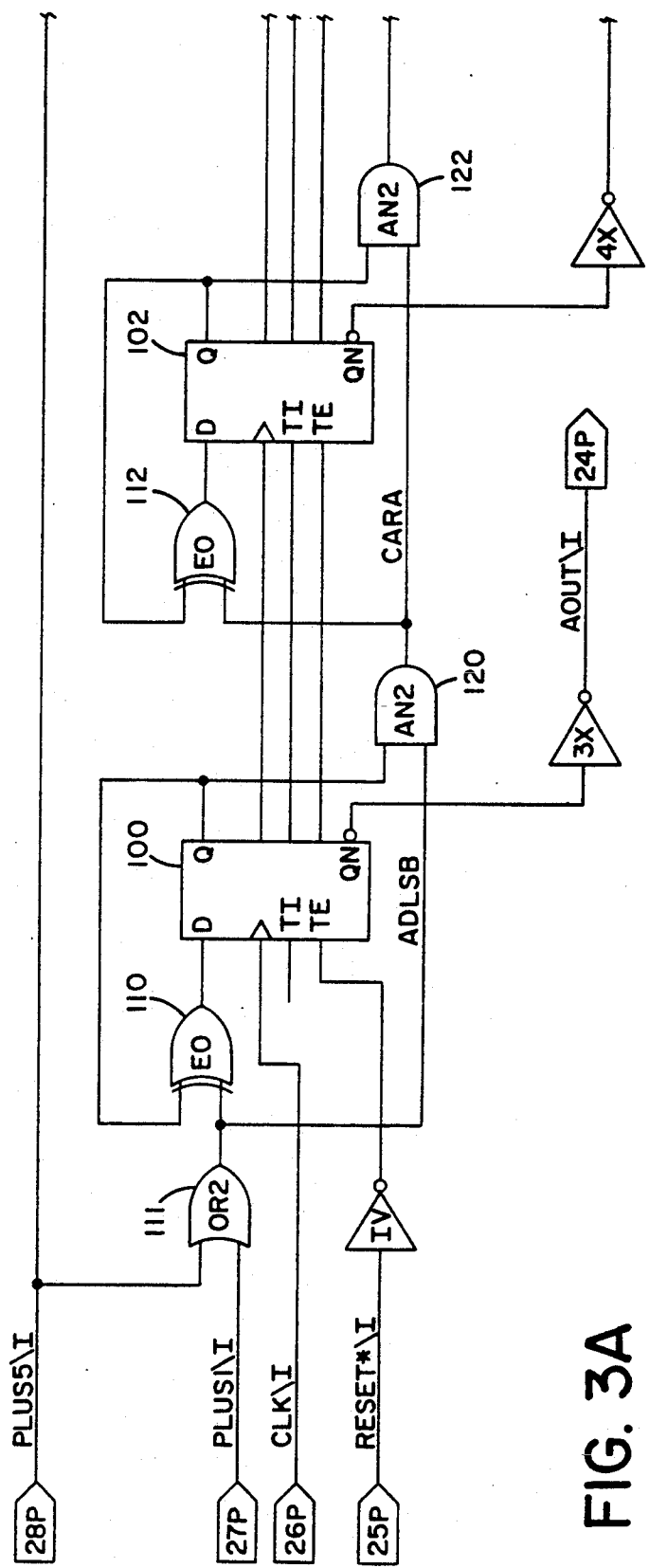
Figure 3B:
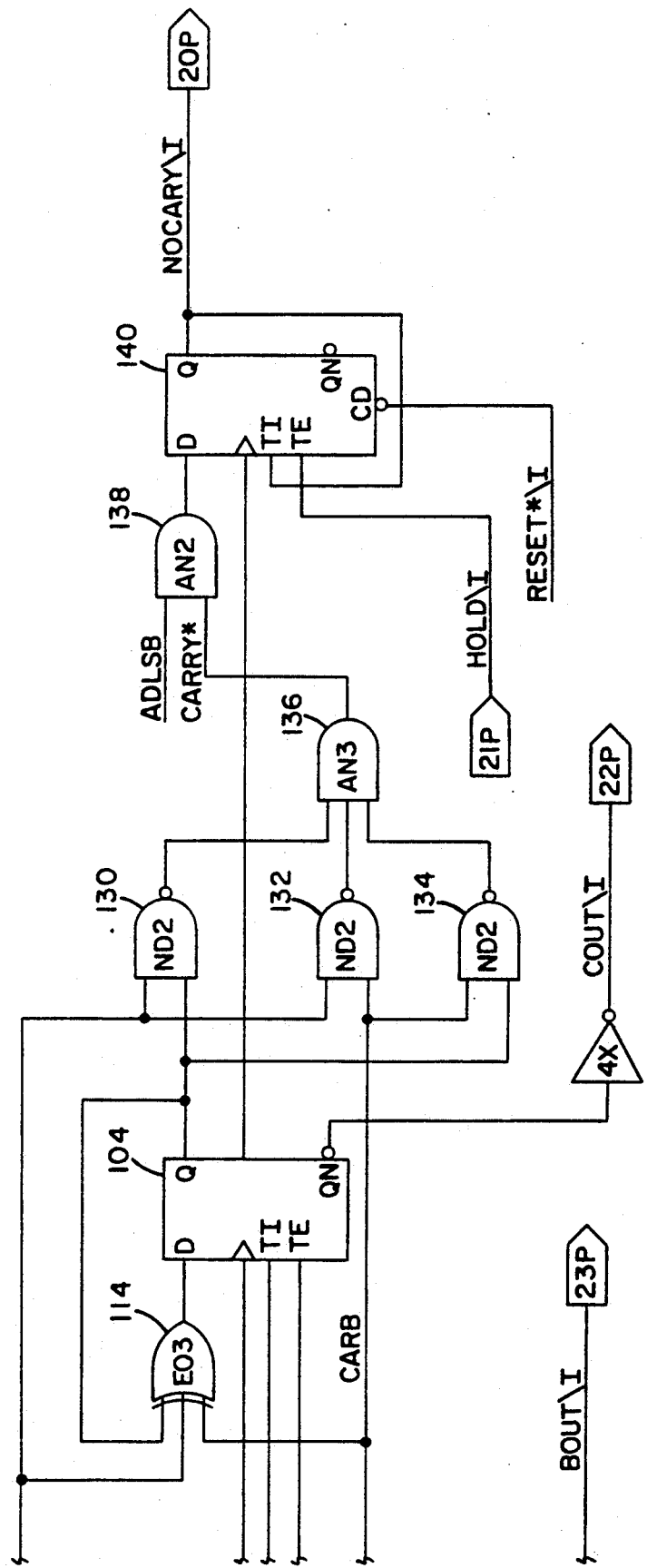
Figure 4A:
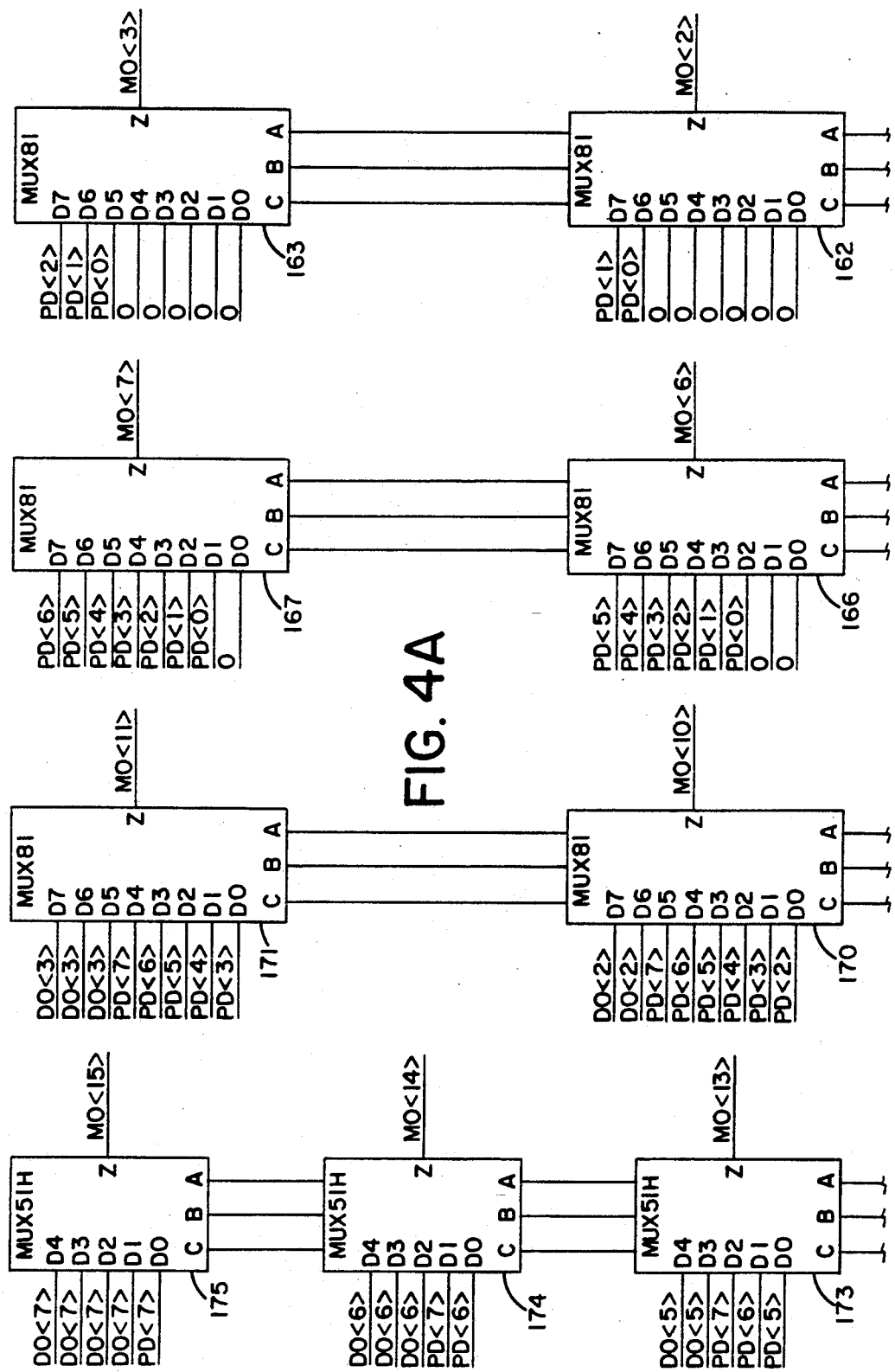
Figure 4B:
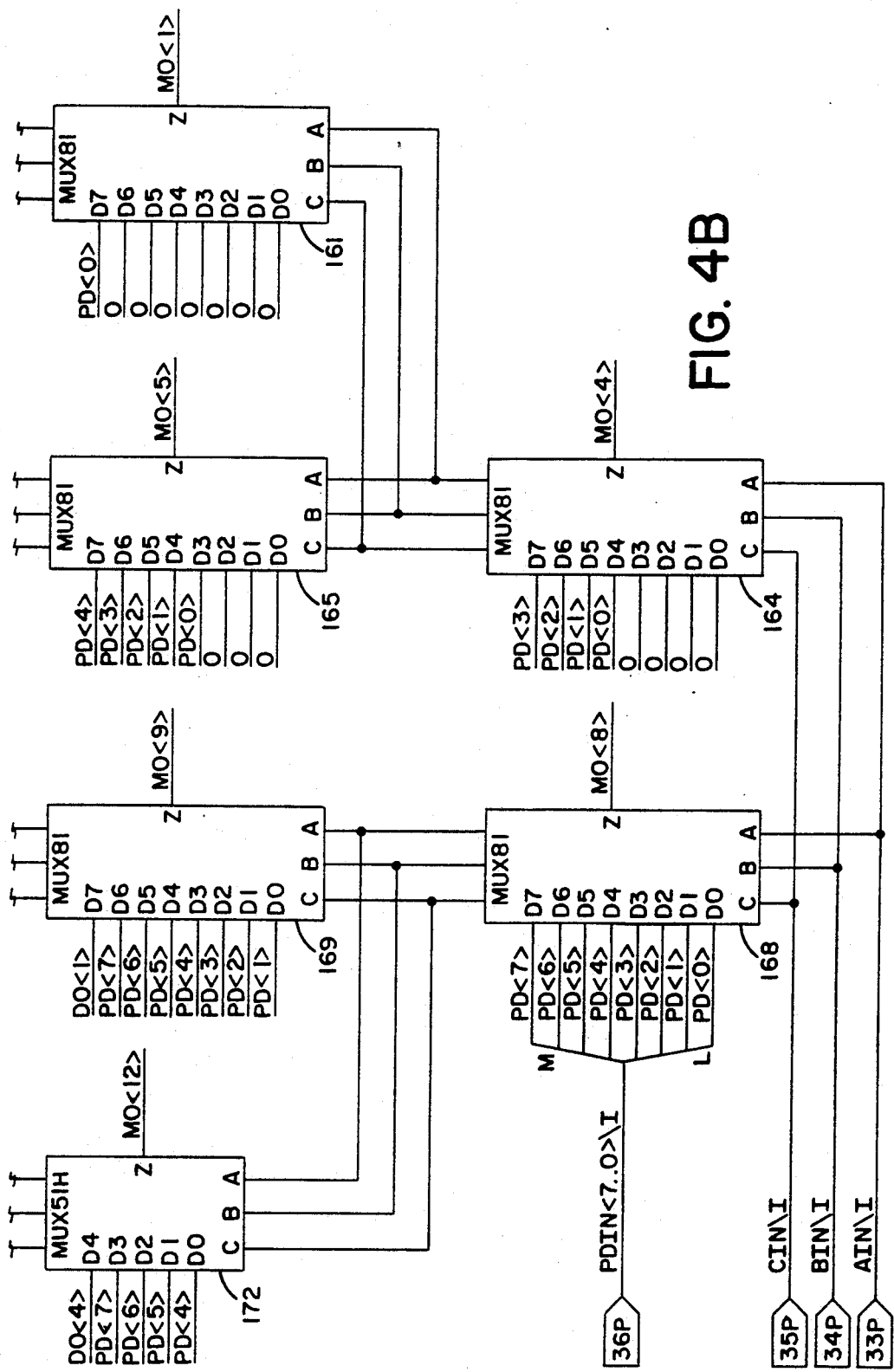
Figure 4C:
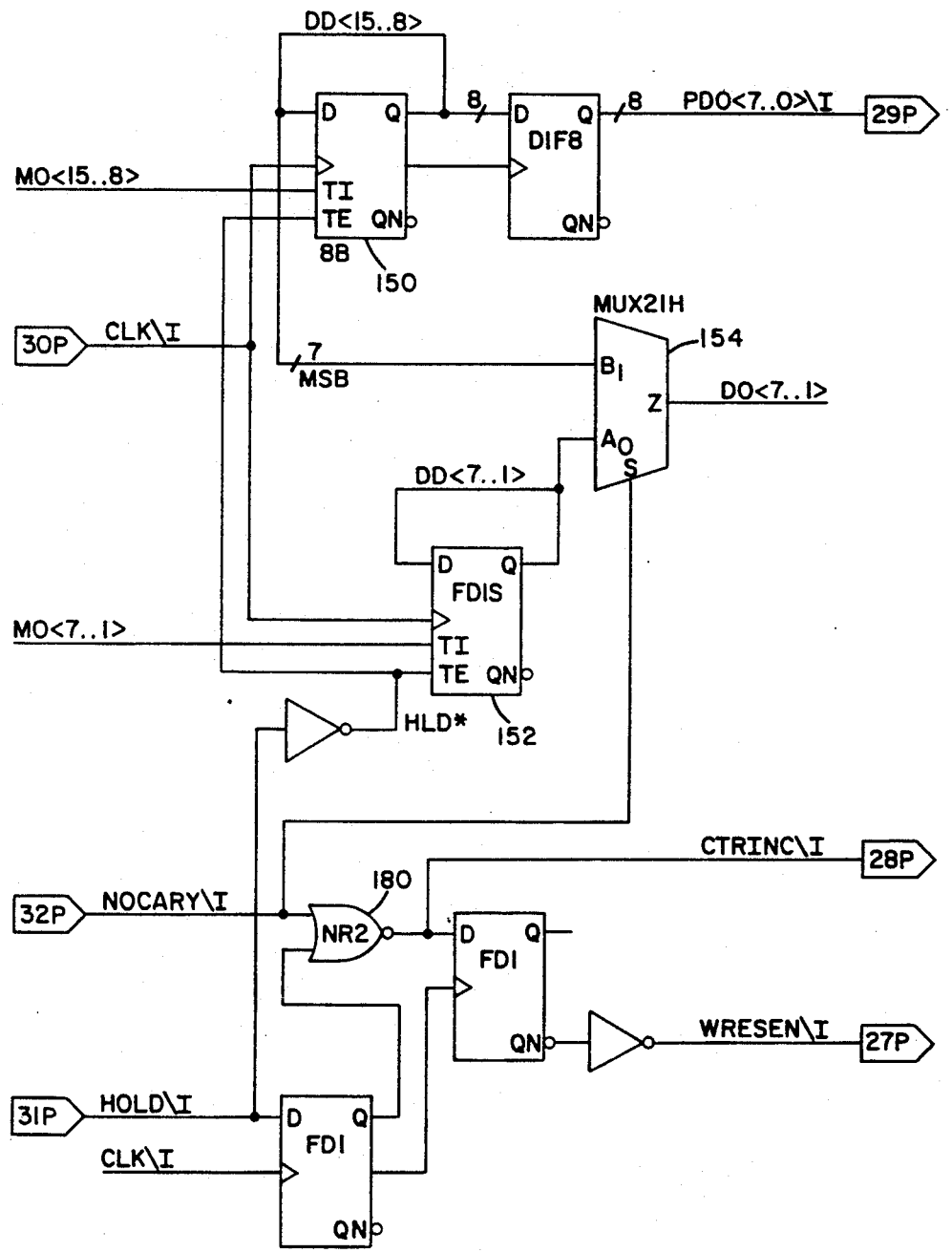
Figure 5A:
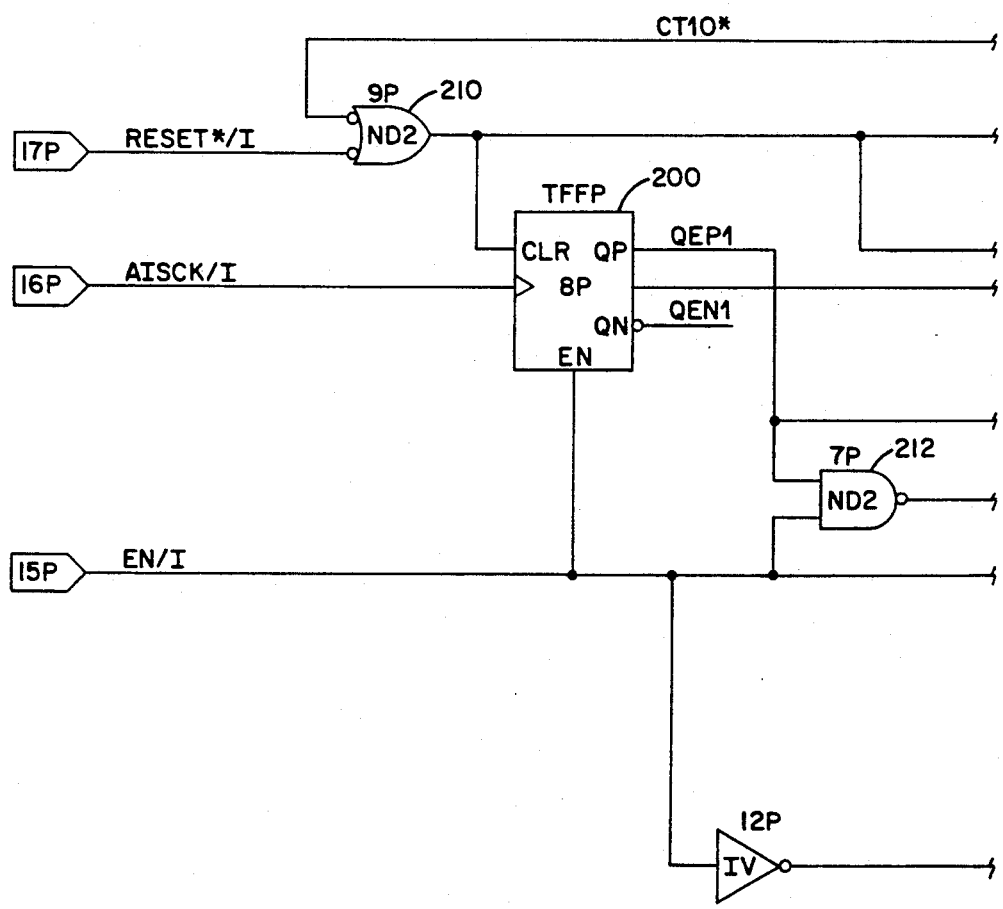
Figure 5B:
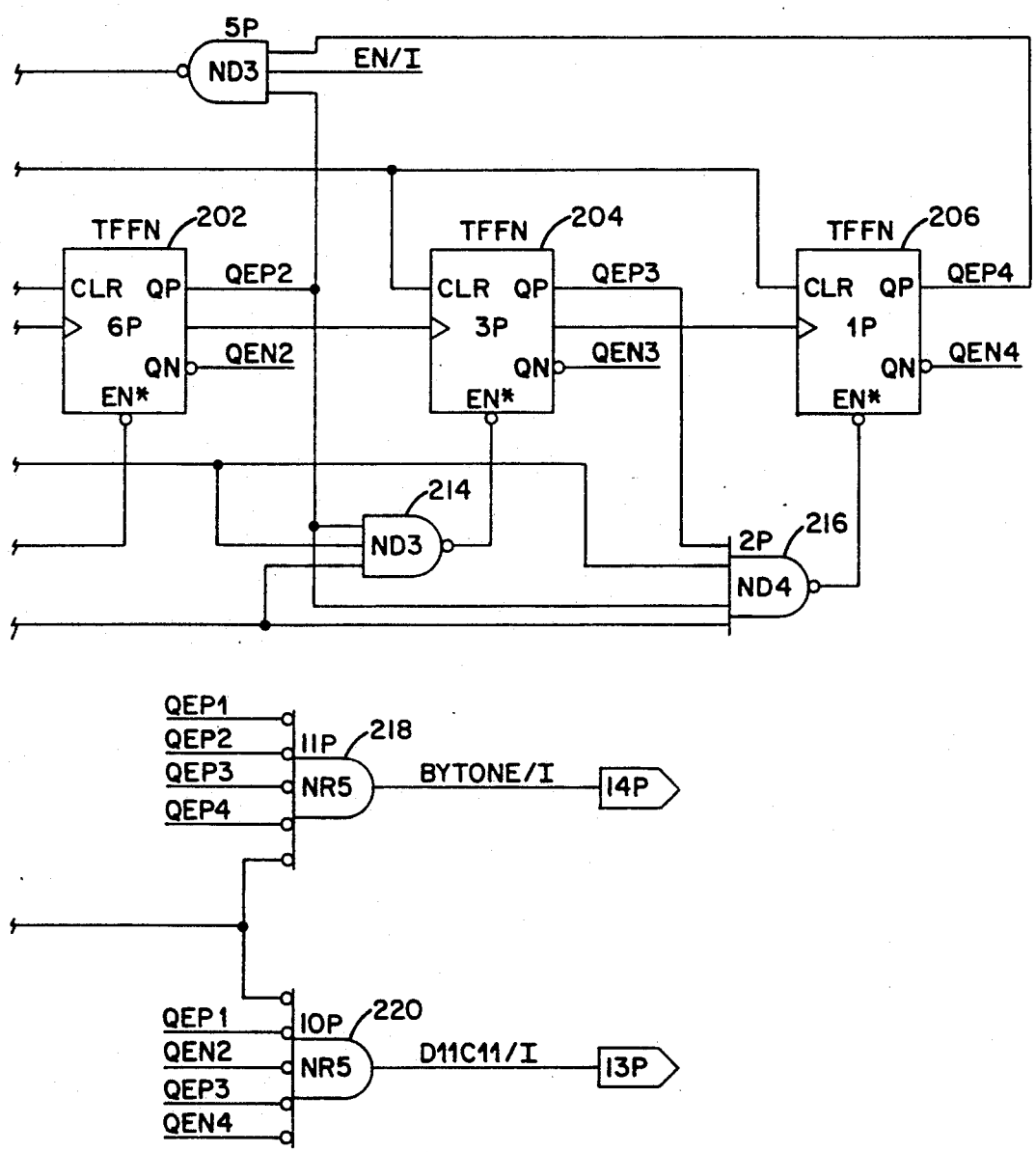

As shown in FIG. 5, the div-by-11 counter 20 is a 4-bit counter having T type toggle flip-flops 200, 202, 204 and 206. Flip-flop 200 has its $Q_b$ output as an input to NAND gate 212 together with an enable signal EN. The output of NAND gate 212 is an active low input to the enable input EN* of flip-flop 202. Flip-flops 202 and 204 are similarly connected by NAND gate 214, and flip-flops 204 and 206 are connected by NAND gate 216. The 4-bit counter cycles from "0000", "0001", "0010", "0011", ..., "1010", "0000". When the counter reaches "1010" inputs OEN4, OEP3, OEN2 and OEP1 combine to generate the D11C11 control signal which indicates that a block of 85 bits have been counted. The four flip-flops receive the alarm signal indication enable AISEN (see FIG. 2) as their respective clock input AISCK.

In operation, the div-by 11 counter 20 is initialized to "0000" when the active low reset signal RESET* is input to a NOR gate 210, which clears flip flops 200, 202, 204 and 206. On the first clock pulse, active low inputs OEP1, OEP2, OEP3, OEP4 of gate 218 generate a BYTONE output signal, which is used to define the first 5 bits of each block of DS3 data generated by the AIS and idle code generation means. This will be explained in more detail below.

The next ten counts of div-by-11 counter 20 indicate respectively the next 10 separate bytes of data that follow as a data stream of 80 bits in the block of data. A D11C11 output signal indicates the end of a block of 85 bits. As shown best is FIG. 2, the D11C11 output signal enables the div-by-8 counter 22, and is input into D1/11 of the div-by-7 counter 24.

7. The Div-By-8 Counter

Figure 6:
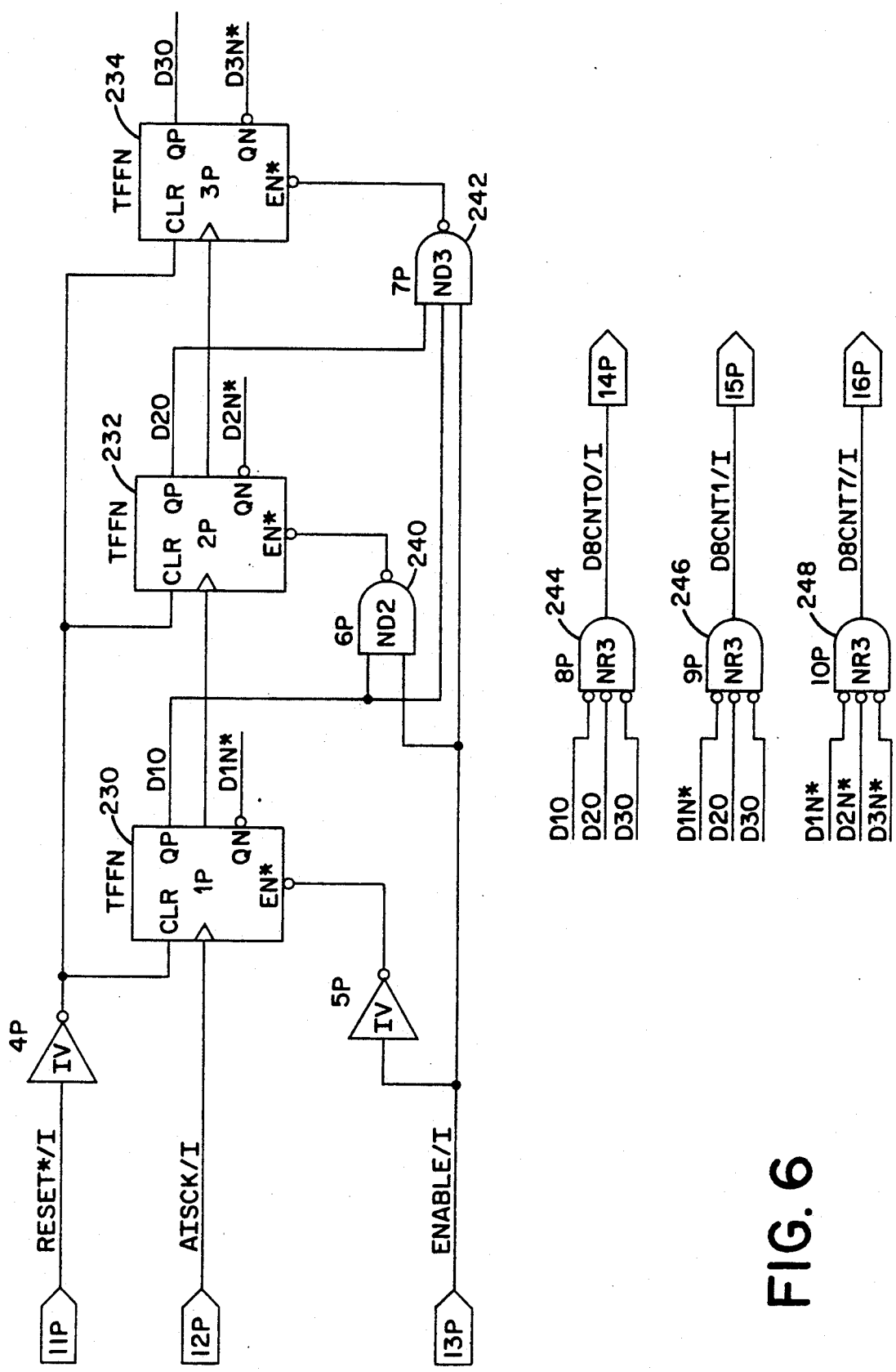
FIG. 6 shows a schematic of a div-by-8 counter.

As shown in FIG. 6, the div-by-8 counter 22 is a 3-bit counter, having three T-type flip-flops 230, 232 and 234 arranged to count the 8 subframes of data that comprise an M-frame. Flip-flop 230 has its $Q_p$ output D10 as an input to NAND gate 240 together with an enable signal EN. The output of NAND gate 240 is an active low input to the enable input EN* of flip-flop 232. Flip-flops 232 and 234 are similarly connected by NAND gate 242. The 3-bit counter cycles from "000", "001", "010", "011", ..., "111", "000". The div-by-8 counter 22 receives similar inputs as the div-by-11 counter 20. Gates 244, 246 and 248 generate div-by-8 control signals D8CNT0, D8CNT1 and D8CNT 7 respectively, which determine which subframes receive a first control bit of "1", see FIG. 2 as discussed above.

8. The Div-By-7 Counter

Figure 7:
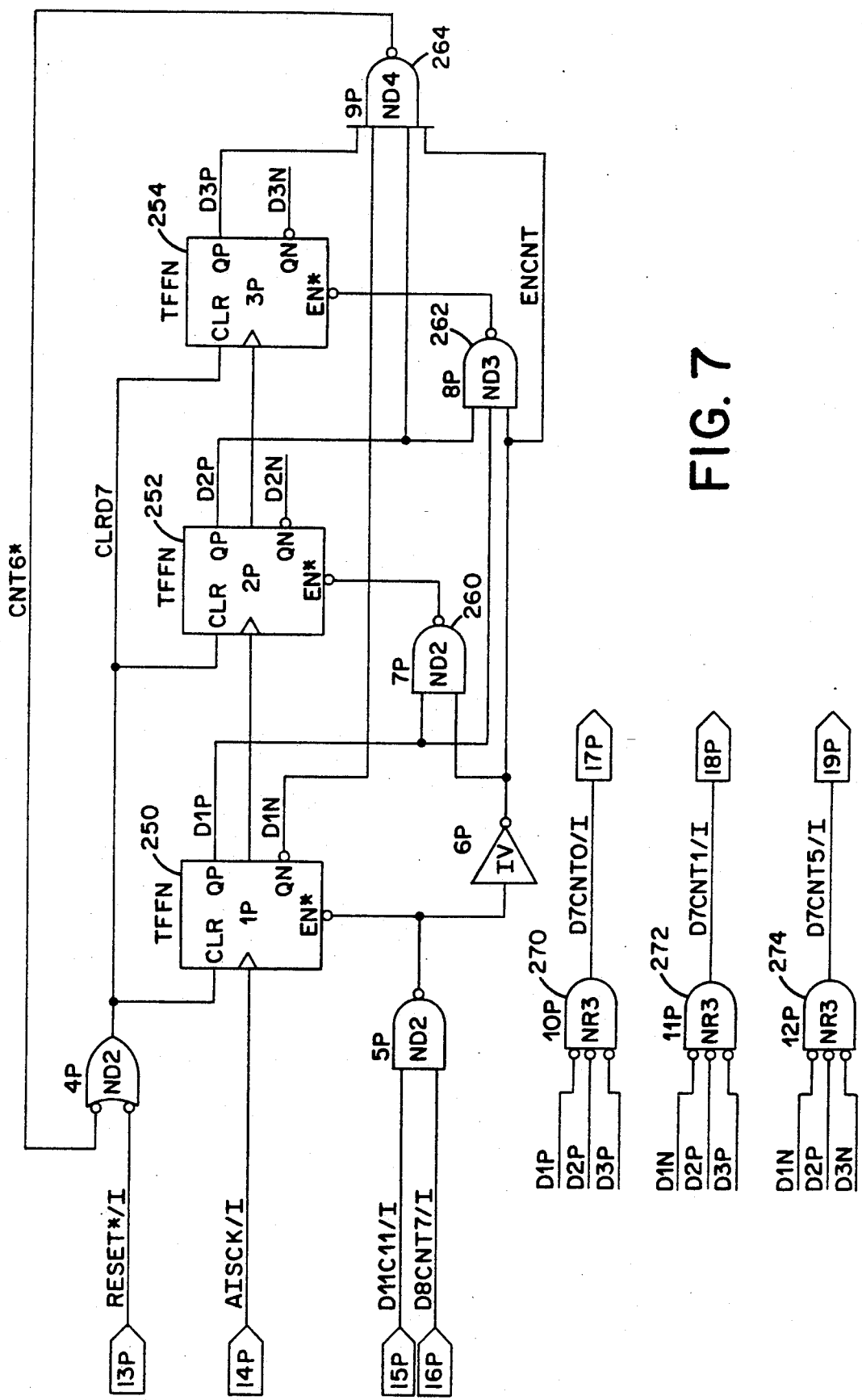
FIG. 7 shows a schematic of a div-by-7 counter.

As shown in FIG. 7, the div-by-7 counter 24 is a 3-bit counter, having three T-type flip-flops 250, 252 and 254 arranged to count the 7M-frames of data that comprise the DS3 frame. Flip-flop 260 has its $Q_p$ output DIP as an input to NAND gate 260 together with an enable signal EN. The output of NAND gate 260 is an active low input to the enable input EN* of flip-flop 252. Flip-flops 252 and 254 are similarly connected by NAND gate 262. The 3-bit counter cycles from "000", "001", "010", "110", ..., "110", "000". The div-by-7 counter 24 receives similar inputs as the div-by-11 counter 20 and div-by-8 counter 22. Gates 270, 272 and 274 generate div-by-7 control signals D7CNT0, D7CNT1 and D7CNT5 respectively which determine which M-frames receive a first control bit of "1", see FIG. 2 as discussed above.

9. The Byte Counter

As best shown in FIG. 1, the AIS/Idle byte counter 8 and the div-by-90 counter 6 combine to generate a gapped local SONET clock signal, which is input into the DS3 AIS/Idle code generator 2 as the AIS enable signal AISEN, The AIS/Idle byte counter 8 counts the 699 bytes that comprise a 125 microsecond section of the DS3 frame. The AIS/Idle byte counter counts the number of output bytes per row from the parallel data shifter means 50, 52, allowing 78 bytes for 2 rows and 77 bytes for every third row, which adds up to the 699 DS3 AIS bytes for 9 rows of the STS-1 frame of SONET data. The rest of the bits that make up the STS-1 frame are control and stuffing bits.

Figure 8A:
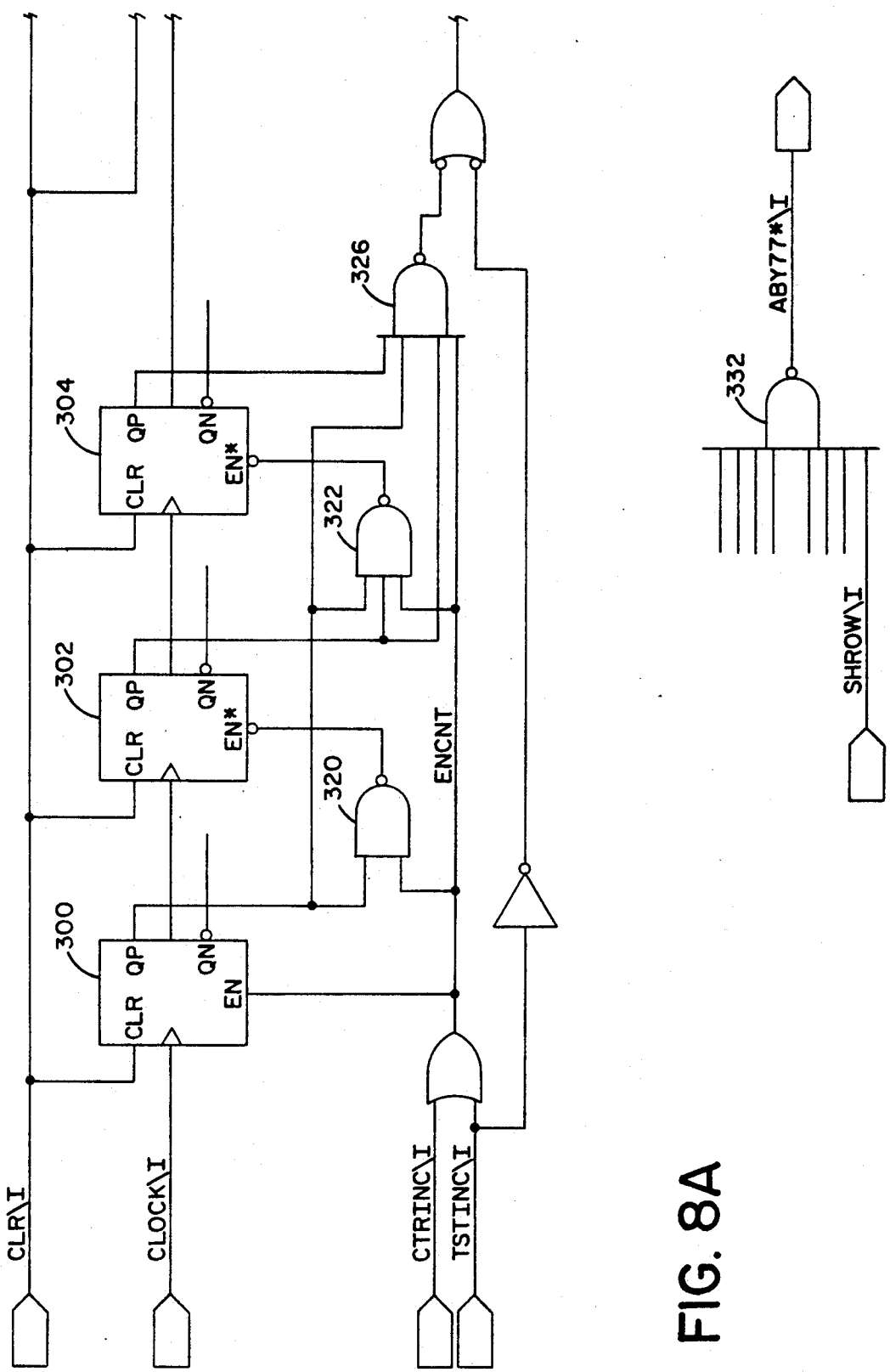
FIG. 8 shows the reconstruction of FIGS. 8A and 8B which show a schematic of a AIS/Idle byte counter.
Figure 8B:
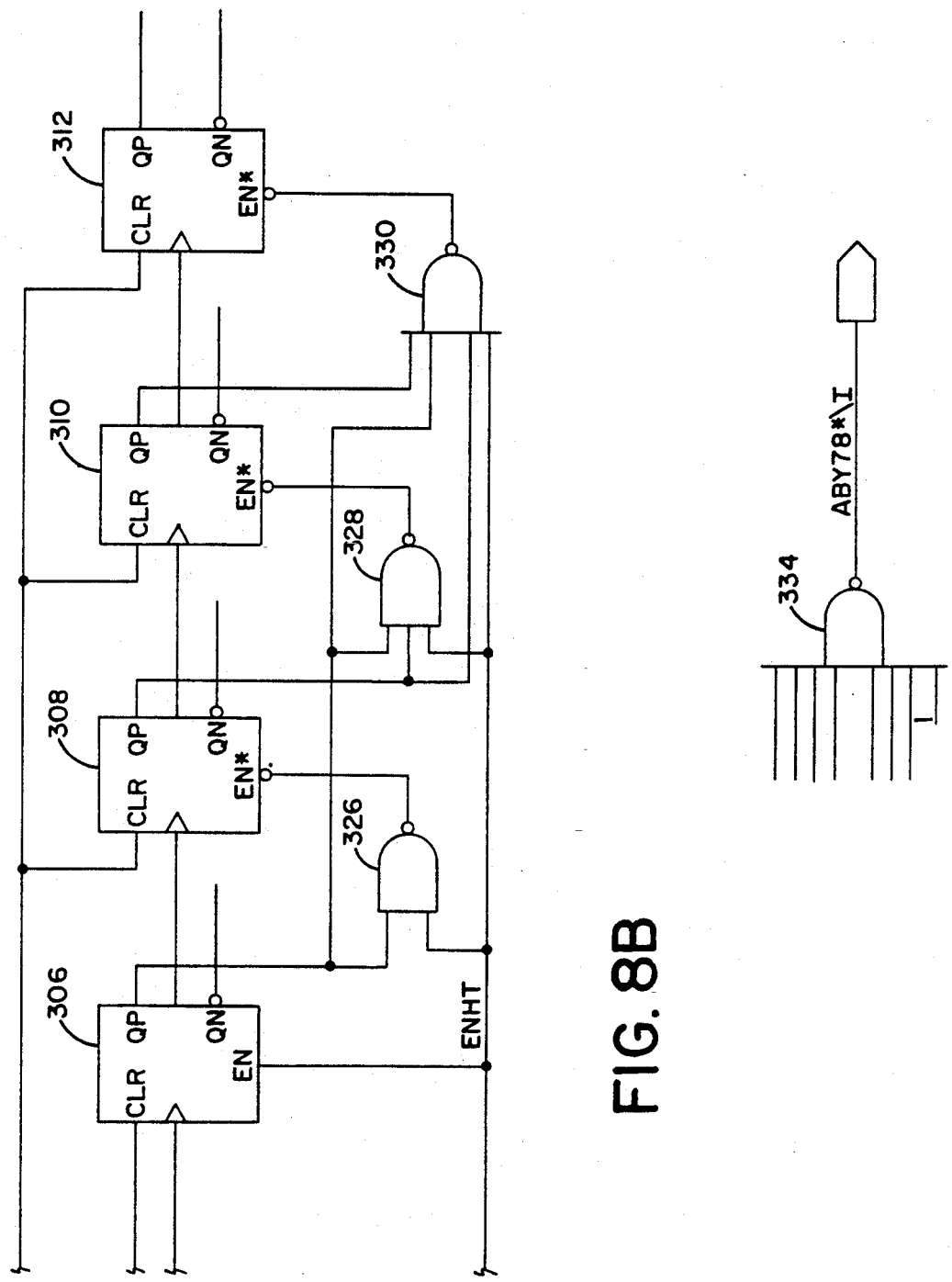

As shown in FIG. 8, the AIS/Idle byte counter 8 is a 7-bit counter, having seven T-type flip-flops 300, 302, 304, 306, 308, 310 and 312, arranged to count the number of DS3 AIS bytes per frame. Combinatorial logic interconnects the 7 flip-flops to perform the counting function, including NAND gates 320, 322, 324, 326, 328, 330. NAND gates 332 and 334 receive suitable inputs from the flip-flops and generate the byte count 77 as an output byte count control signal ABY77*, and the byte count 78 as an output byte count control signal ABY78*. A short row control signal SHROW is generated by flip-flops 12 and 14 combine with suitable combinatorial logic, see FIG. 1, and input into NAND gate 332.

The AIS/Idle byte counter 8 receives a counter input no carry signal CTRINC from parallel data shifting means 50 and 52, see FIGS. 2 and 4. Since the DS3 AIS is generated using the transmitting system clock TXCLK of the STS-1, the correct number of bytes generated must be counted to guarantee the correctness of the DS3 frequency received from the TX DS3 Phase Lock Loop clock (not shown). There are 699 DS3 bytes per frame which translates into six 78 byte rows and three 77 byte rows per frame. After AIS byte counter 8 is cleared, CLR is active high, it will count whenever counter incoming increment signal CTRINC or TSTINC is high. TSTINC is tied low and CTRINC is the elastic store enable prior to being retimed so it indicates the next data byte from parallel data shifting means 50 and 52. Two 8-input NAND gates are used to decode byte control signals ABY77* and ABY78*. The counter is reset after every SONET row after by the count-89 control signal CNT89 from the div-by-90 counter 6, see FIG. 1.

10. The Divide By 90 Counter

The div-by-90 counter 6 provides a gapped SONET clock signal, which is output as AISEN.

Figure 9A:
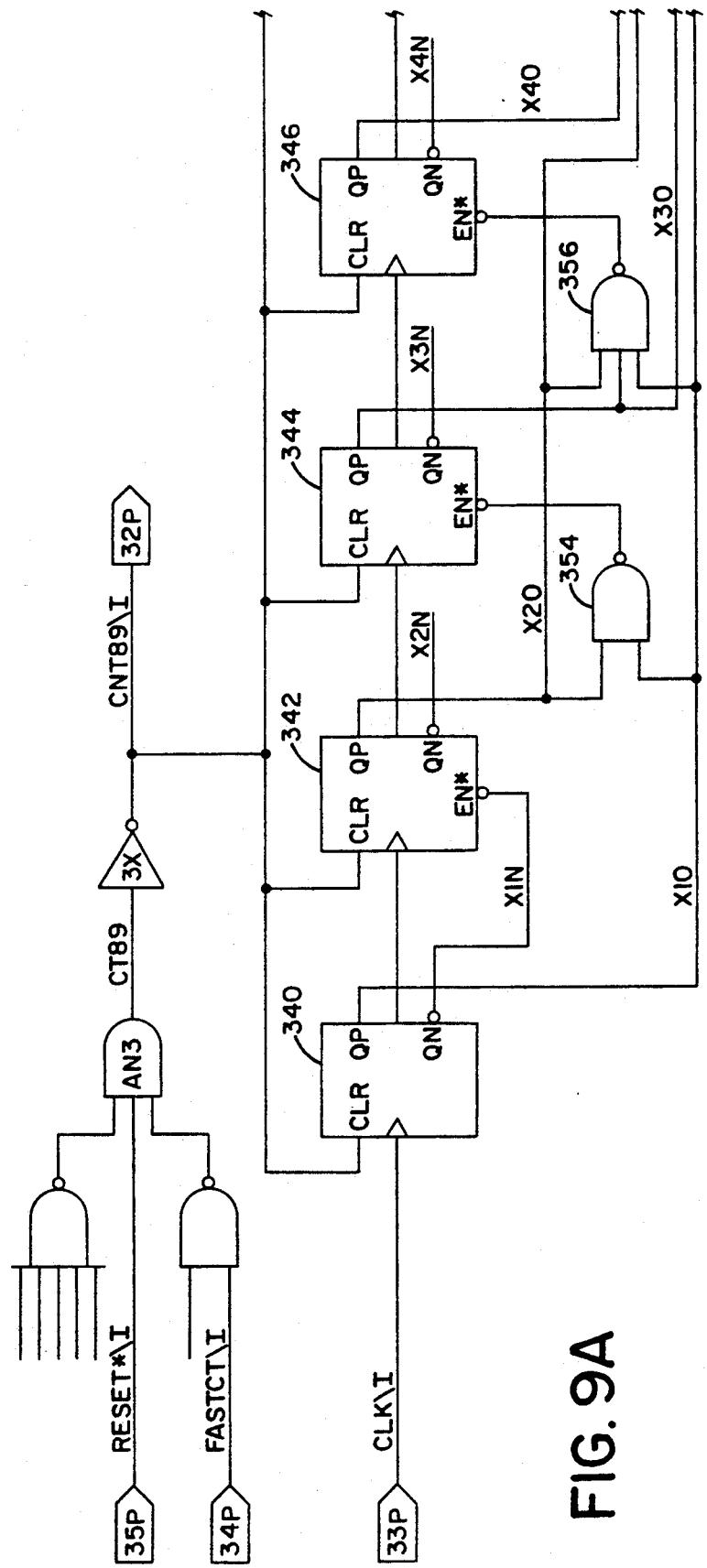
FIG. 9 shows the reconstruction of FIGS. 9A, 9B and 9C which show a schematic of a row counter.
Figure 9B:
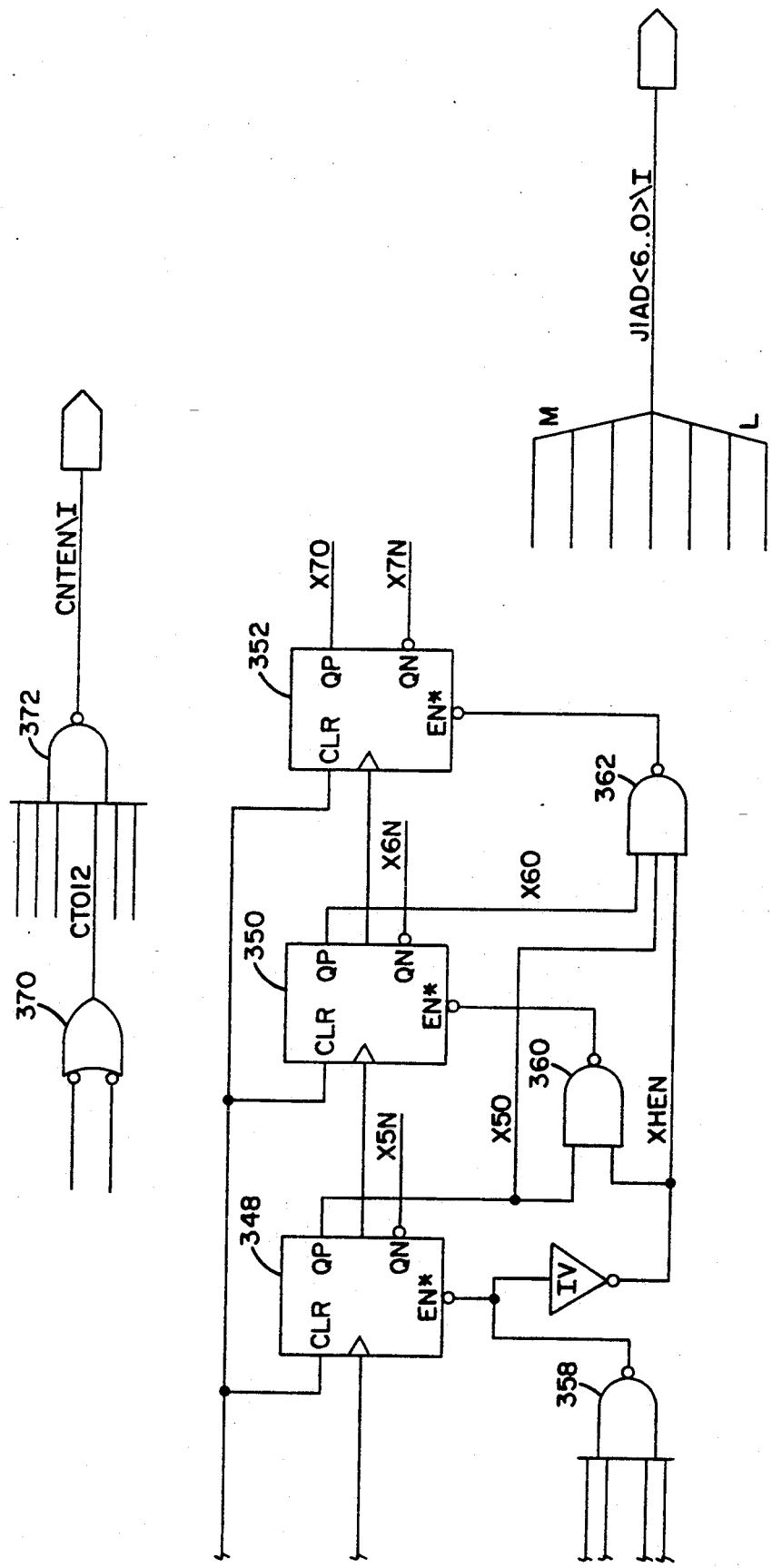
Figure 9C:
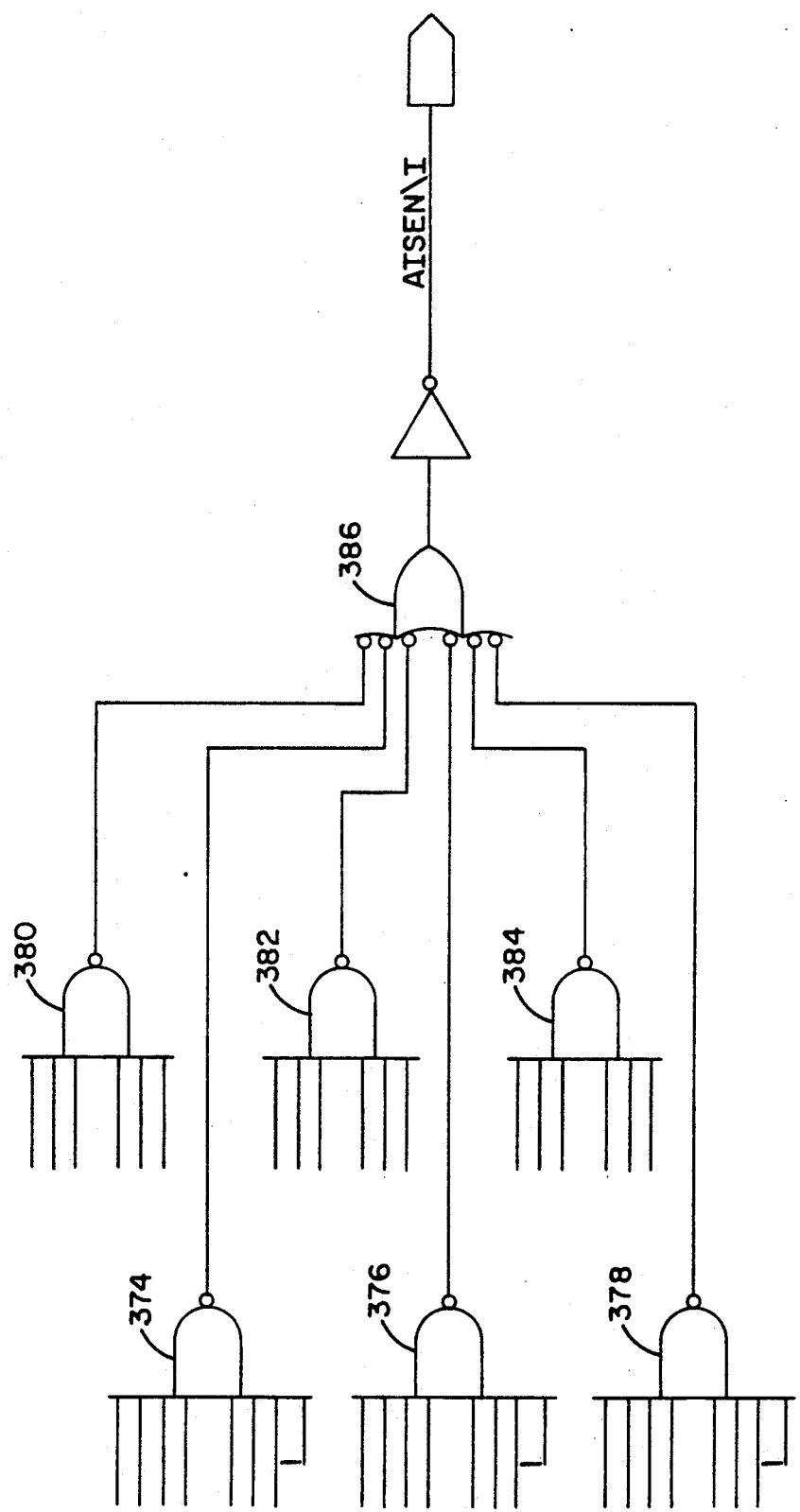

As shown in FIG. 9, the divide-by-90 counter means 6 is a 7-bit free running counter that counts from zero to 89 and then rests to zero. It consists of 7 T-type flip-flops 340, 342, 344, 346, 348, 350 and 352, arranged to count the number of STS-1 AIS bytes per frame. The LSB is a free running toggle flip-flop 340, and the next six bits are toggle flip-flops with a negative enable. Combinatorial logic interconnect the 7 flip-flops to perform the counting function, including NAND gates 354, 356, 358, 360, 362, 364. NAND gates 364, 366 and 368 receive suitable inputs from the flip-flops and generate the count 89 output control signal CNT89. NAND gates 374, 376, 378, 380, 382, 384 and gate 386 receive suitable inputs from the flip-flops to generate the nine gaps in the AIS enable signal AISEN. For example, NAND gate 374 generates a gap in the 44th byte position, NAND gate 380 generates the 20th and 21st gaps, NAND gate 382 generates the 42nd and 43rd gaps, NAND gate 384 generates the 64th and 65th gaps, and NAND gate 376 and NAND gate 378 generates the 86th and 86th gaps, respectively.

The gaps in the SONET clock signal are necessary for the following reason. When the AIS/Idle code signal is generated, as explained above, each 85-bit subframe is generated with a 5-bit byte, and there may be a maximum of eight 5-bit bytes in a given SONET row, which cause a discrepancy when synchronizing the DS3 clock frequency with the STS-1 clock frequency. These 24 missing bits must be accounted for. As a solution, 81 byte opportunities are allowed by the gapped SONET clock to get 78 byte full bytes of data, and 80 byte opportunities are allowed by the gapped SONET clock to get 77 byte full bytes of data. The 9 gaps in the SONET clock at bytes 20, 21, 42, 43, 44, 64, 65, 86 and 88, make allowance for these missing bits.

The div-by-90 counter means can be reset two different ways. The first is by an inverted reset input RE- SET*; the second is by decoding count 89 which is the normal operating mode. A high drive inverter is used to reset the seven bits and to be an end of frame output sync CNT89.

The divide-by-90 counter means 6 cooperates with the AIS generator 4 where it must allow 81 byte signal pulses to get 78 full bytes of DS3 data, which result in the 9 gaps in the output AISEN are decoded at positions 20, 21, 42, 43, 44, 64, 65, 86, and 88. The last two are one byte gaps to allow the AIS byte counter 8 time to count and decide on the last two bytes in the row.

The DS3 AIS/Idle code generator 4 uses the div-by-90 counter means 6 to define the byte clock pulses for each SONET row. The end of row count CNT89 is retimed CLEAR signal to prevent a problem with the decision logic. The CLEAR signal is used to reset the AIS byte counter 8 and to increment the row count. Two toggle flip flops are used to count rows. Row counts zero and one allow the 78 byte AIS rows to be generated and count the three short rows with the short row control signal SHROW, which generates the 77 byte row, and reset the row count back to zero. Two 2-input OR gates have the CLEAR signal with byte count signal ABY78* or byte count signal ABY77*. The outputs of the two OR gates combine in an AND gate with AISEN from the div-by-90 counter means 6 to stop interface device when the required number of bytes is generated. The exact number cannot be decoded due to the random distribution of the 5-bit bytes being generated. They do not map evenly into SONET frame boundaries. FIGS. 10 and 11 shows a timing diagram for generating a 77 byte row and a 78 byte row respectively.

Similarly, although the invention has been shown and described with respect to a preferred embodiment thereof, it would be understood by those skilled in the art that other various changes, omissions and additions thereto may be made without departing from the spirit and scope of the present invention. For example, the present invention can be readily adapted by one skilled in the art for use in formatting digital asynchronous signals to any of a number of signal formats, including,
DS3 to STS-1
STS-1 to DS3.

What is claimed is:

1. Apparatus for generating bytes of data received from a given byte generating means in a given frame format having a predetermined number of bytes per row comprising:
   byte counting means for counting bytes to be mapped per row of the given frame format, and generating bytecount control signals depending on the bytecount;
   local clock pulse counting means for counting clock pulses per row of the given frame format and generating a clock pulse control signal; and
   enabling control means for receiving the bytecount control signals and the clock pulse control signal, and generating a byte generation control signal having a properly gapped enable control signal with at least one logical gap depending on the difference between the number of bytes generated and clock pulses per row of the frame format.

2. Apparatus as claimed in claim 1, wherein the byte counting means comprises a plurality of flip-flops and associated combinatorial logic gates for counting the bytes.

3. Apparatus as claimed in claim 2, wherein the byte counting means has combinatorial logic gates and receives inputs from the plurality of flip-flops for generating the bytecount control signals.

4. Apparatus as claimed in claim 1, further comprising short row control signal generating means for generating a short row control signal to the byte counting means at periodic row intervals.

5. Apparatus as claimed in claim 1, wherein the enabling control means further comprises an AND gate for receiving the bytecount control signals and the clock pulse control signal, and for generating an enable pulse to the byte generating means.

6. Apparatus for converting a DS3 signal in a DS3 frame format to an STS-1 digital signal in an STS-1 frame format as a function of an STS-1 local clock comprising:
   DS3 AIS/Idle code generation the means for generating DS3 signal having DS3 AIS/Idle code bytes in response to the local STS-1 clock signal;
   DS3 byte counter for counting the DS3 AIS/Idle code bytes and generating an AIS/Idle bytecount enable control signal if the number of DS3 AIS/Idle code bytes is less than a predetermined number of DS3 bytes to be mapped in a given row of the STS-1 frame; and
   STS-1 row counting means for counting pulses of the STS-1 local clock signal and generating a gapped STS-1 enable control signal, which is combined with the AIS/Idle byte count enable control signal and fed back to enable and disable the DS3 AIS/Idle code generation means for mapping DS3 AIS/Idle code bytes in the given row of the STS-1 frame.

7. Apparatus as claimed in claim 6, wherein the DS3 byte counter comprises a plurality of flip-flops and associated combinatorial logic gates for counting the DS3 AIS/Idle code bytes.

8. Apparatus as claimed in claim 7, wherein the DS3 byte counter has combinatorial logic gates and receives input from the plurality of flip-flops for generating an AIS/Idle bytecount enable control signal.

9. Apparatus as claimed in claim 6, wherein the STS-1 row counting means comprises a plurality of flip-flops and associated combinatorial logic gates for counting pulses of the STS-1 local clock signal.

10. Apparatus as claimed in claim 9, wherein the STS-1 row counting means has combinatorial logic gates and receives inputs from the plurality of flip-flops for generating a gapped STS-1 enable control signal.

11. Apparatus as claimed in claim 6, wherein the apparatus further comprises short row control signal generating means for generating a short row control signal to the DS3 byte counting means at periodic row intervals of the STS-1 frame.

12. Apparatus for generating bytes of data, received from a given byte generating means, into a given frame format having a predetermined number of bytes per row, comprising:
   byte counting means for counting bytes to be mapped per row of the given frame format, and generating bytecount control signals depending on the byte count:
   local clock pulse counting means for receipt of local clock pulses, said means having a divide-by-90 counting means with a plurality of flip-flops and associated combinatorial logic gates for counting the local clock pulses per row of the given frame format and generating a clock pulse control signal; and enabling control means for receiving the bytecount control signals and the clock pulse control signal, and generating a byte generation control signal having properly gapped enable control signals with at least one logical gap depending on the difference between the number of bytes generated and local clock pulses per row of the frame format.

13. Apparatus as claimed in claim 12, wherein the plurality of flip-flops counts the local clock pulses and the combinatorial logic gates generate the gapped enable control signals.

* * * * *